(12) United States Patent
Shibata

(10) Patent No.: US 10,812,924 B2
(45) Date of Patent: Oct. 20, 2020

(54) CONTROL APPARATUS CONFIGURED TO CONTROL SOUND OUTPUT APPARATUS, METHOD FOR CONTROLLING SOUND OUTPUT APPARATUS, AND VEHICLE

(71) Applicant: HONDA MOTOR CO., LTD., Tokyo (JP)

(72) Inventor: Naoki Shibata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/287,216

(22) Filed: Feb. 27, 2019

(65) Prior Publication Data

US 2019/0289415 A1 Sep. 19, 2019

(30) Foreign Application Priority Data

Mar. 19, 2018 (JP) .................................. 2018-051148

(51) Int. Cl.
  *H04S 7/00* (2006.01)
  *G10L 17/00* (2013.01)
  *G06F 3/16* (2006.01)
(52) U.S. Cl.
  CPC .............. *H04S 7/302* (2013.01); *G06F 3/167* (2013.01); *G10L 17/005* (2013.01); *H04S 7/307* (2013.01); *H04R 2499/13* (2013.01)

(58) Field of Classification Search
  CPC .......... H04S 7/302; H04S 7/307; G06F 3/167; G10L 17/005; G10L 21/013; G10L 21/0364; G10L 25/24; G10L 25/90; H04R 2499/13
  See application file for complete search history.

(56) References Cited

U.S. PATENT DOCUMENTS

| 5,876,213 A | * | 3/1999 | Matsumoto | G10H 1/366 434/307 A |
| 9,620,140 B1 | * | 4/2017 | Linnig | G10L 21/013 |
| 2014/0370836 A1 | * | 12/2014 | Gladstone | H04W 4/90 455/404.1 |
| 2018/0308462 A1 | * | 10/2018 | Wang | G10H 1/366 |

FOREIGN PATENT DOCUMENTS

JP 2017-67852 A 4/2017

OTHER PUBLICATIONS

Wikipedia, Aircraft carrier, Mar. 14, 2018, https://web.archive.org/web/20180314152451/https://en.wikipedia.org/wiki/Aircraft_carrier.*

* cited by examiner

*Primary Examiner* — Mark Fischer
(74) *Attorney, Agent, or Firm* — Westerman, Hattori, Daniels & Adrian, LLP

(57) ABSTRACT

A control apparatus for controlling a sound output apparatus is provided. The control apparatus includes a specifying unit configured to specify an aspect of sound that is being generated in a space, and a control unit configured to control the sound output apparatus so as to output sound information in an aspect that is different from the specified aspect while sound is being generated in the space.

13 Claims, 5 Drawing Sheets

CONTROL APPARATUS CONFIGURED TO CONTROL SOUND OUTPUT APPARATUS, METHOD FOR CONTROLLING SOUND OUTPUT APPARATUS, AND VEHICLE

CROSS-REFERENCE TO RELATED APPLICATION(S)

This application claims priority to and the benefit of Japanese Patent Application No. 2018-051148 filed on Mar. 19, 2018, the entire disclosure of which is incorporated herein by reference.

BACKGROUND OF THE INVENTION

Field of the Invention

The present invention relates to a control apparatus configured to control a sound output apparatus, a method for controlling a sound output apparatus, and a vehicle.

Description of the Related Art

A driver of a vehicle is notified of various types of information. If sound information is provided while a driver is talking with a fellow passenger in a vehicle or enjoying the sound content such as that of a radio or television, there is a possibility that the driver will not hear this sound information. Japanese Patent Laid-Open No. 2017-067852 discloses that, if the priority of sound information is low, this sound information is provided after a conversation ends.

SUMMARY OF THE INVENTION

Sound information with a high degree of urgency such as a takeover request during automated driving needs be provided immediately even if a driver is listening to other sound. Urgent sound information is provided not only in a vehicle interior of an automobile but also in another space such as a conference room. An aspect of the present invention is to provide a technique for providing sound information that can be easily understood while other sound is being generated.

According to an embodiment of the present invention, a control apparatus for controlling a sound output apparatus, the control apparatus comprising: a specifying unit configured to specify an aspect of sound that is being generated in a space; and a control unit configured to control the sound output apparatus so as to output sound information in an aspect that is different from the specified aspect while sound is being generated in the space is provided.

DESCRIPTION OF THE EMBODIMENTS

Figure 1:
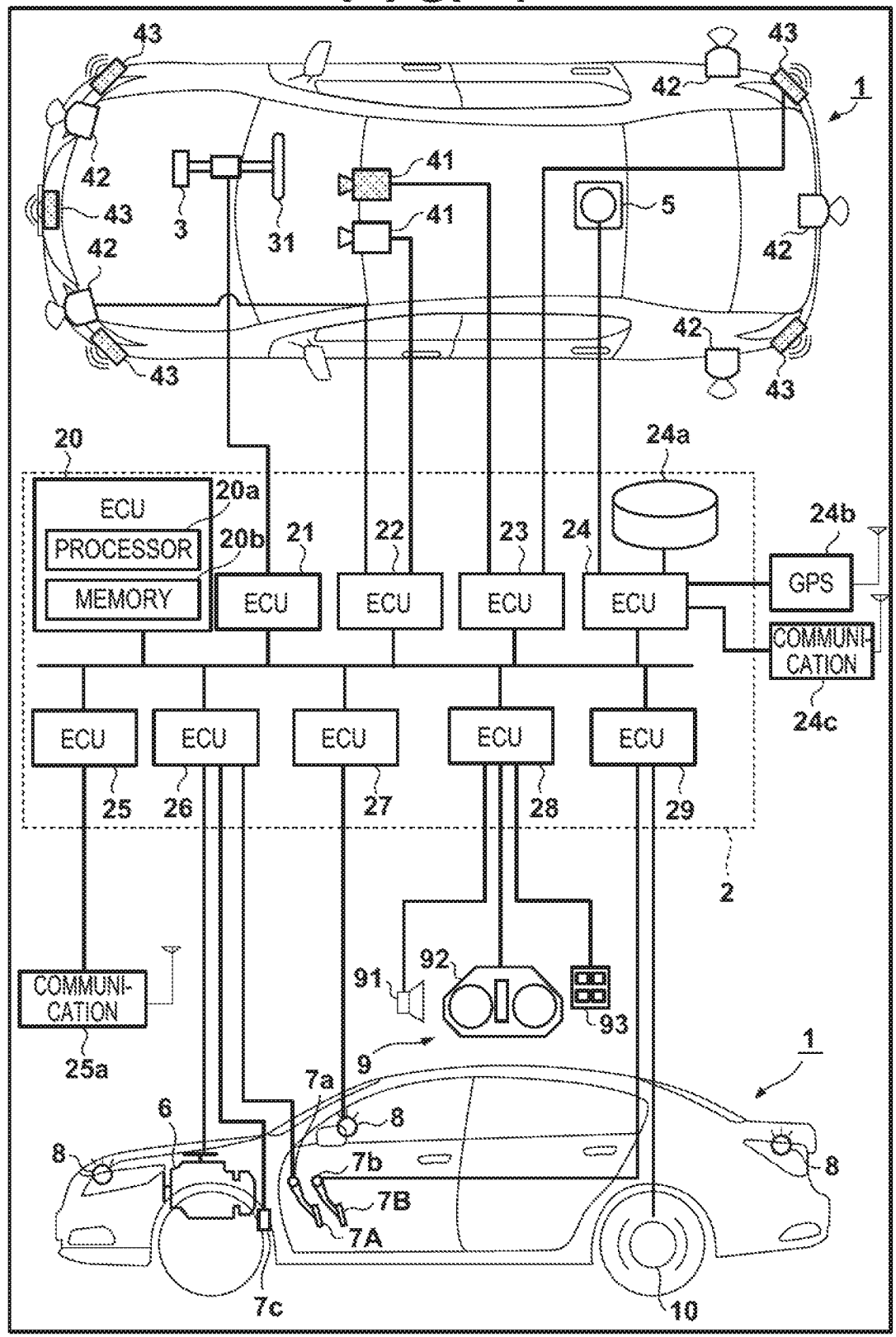
FIG. 1 is a block diagram illustrating a configuration example of a vehicle according to an embodiment.

An embodiment of the present invention will be described below with reference to the attached drawings. The same elements are given the same reference numerals in various embodiments, mid a redundant description is omitted. Also, embodiments may be modified and combined as appropriate.

A vehicle 1 includes a vehicle control apparatus 2 (hereinafter, simply referred to as the "control apparatus 2") configured to control the vehicle 1. The control apparatus 2 includes a plurality of ECUs 20 to 29 that are communicably connected to each other using an in-vehicle network. The ECUs each include a processor represented by a CPU, a memory such as a semiconductor memory, an interface with an external device, and the like. Programs executed by the processor, data used by the processor in processing, and the like are stored in the memory. The ECUs may also each include multiple processors, memories, interfaces, and the like. For example, an ECU 20 includes a processor 20a and a memory 20b. As a result of the processor 20a executing a command that is included in a program stored in the memory 20b, processing is executed by the ECU 20. Instead of this, the ECU 20 may include a dedicated integrated circuit for executing processing performed by the ECU 20, such as an ASIC. The same applies to the other ECUs.

Hereinafter, functions and the like of the ECUs 20 to 29 will be described. Note that the number of ECUs and their functions can be designed as appropriate, and the functions and the like may be divided or integrated more than in the present embodiment.

The ECU 20 executes control related to automated driving of the vehicle 1. In automated driving, at least one of steering of the vehicle 1 and/or acceleration/deceleration is automatically controlled. In an example of a control, which will be described later, both steering and acceleration/deceleration are automatically controlled.

The ECU 21 controls an electric power steering apparatus 3. The electric power steering apparatus 3 includes a mechanism for steering the front wheels according to a driving operation (steering operation) performed by a driver on a steering wheel 31. Also, the electric power steering apparatus 3 includes a motor that exerts a driving force for assisting a steering operation and automatically steeling the front wheels, a sensor that detects a steering angle, and the like. If the driving state of the vehicle 1 is automated driving, the ECU 21 automatically controls the electric power steering apparatus 3 according to an instruction issued by the ECU 20, and controls the direction in which the vehicle 1 moves.

The ECUs 22 and 23 control detection units 41 to 43 configured to detect the state of the surrounding region of the vehicle and perform information processing on detection results. The detection units 41 are cameras configured to capture images of that forward of the vehicle 1 (hereinafter, referred to as "cameras 41" in some cases), and in the present embodiment, the detection units 41 are attached to front portion of the roof on the vehicle interior side of the front window of the vehicle 1. A contour of a target and lane markers (white lines and the like) of lanes on a road can be extracted by analyzing the images captured by the cameras 41.

The detection units 42 are LIDARs (Light Detection and Ranging) (referred to as a "LIDAR 42" in some cases hereinafter), and detect a target in the surrounding region of the vehicle 1 and measure the distance to a target, for example. In the present embodiment, five LIDARs 42 are provided, and each corner portion of a front portion of the vehicle 1 is provided with one LIDAR 42, the center of a rear portion is provided with one LIDAR 42, and each side of the rear portion is provided with one LIDAR 42. The detection units 43 are millimeter wave radars (referred to as a "radar 43" in some cases hereinafter), and detect a target in the surrounding region of the vehicle 1 and measure the distance to a target, for example. In the present embodiment, five radars 43 are provided, and the center of the front portion of the vehicle 1 is provided with one radar 43, each corner portion of the front portion is provided with one radar 43, and each corner portion of the rear portion is provided with one radar 43.

The ECU 22 controls one of the cameras 41 and the LIDARs 42, and performs information processing on detection results. The ECU 23 controls the other camera 41 and the radars 43, and performs information processing on detection results. By providing two sets of apparatuses configured to detect the state of the surrounding region of the vehicle, it is possible to improve the reliability of the detection results, and by providing different types of detection units such as cameras, LIDARs, and radars, it is possible to analyze the surrounding environment of the vehicle in various ways.

The ECU 24 controls a gyro sensor 5, a GPS sensor 24b, and a communication apparatus 24c, and performs information processing on detection results or communication results. The gyro sensor 5 detects rotational motion of the vehicle 1. It is possible to determine a path of the vehicle 1 using the detection results of the gyro sensor 5, wheel speed, and the like. The GPS sensor 24b detects the current position of the vehicle 1. The communication apparatus 24c performs wireless communication with a server that provides map information and traffic information, and acquires these pieces of information. The ECU 24 can access a database 24a for map information constructed in a memory, and the ECU 24 searches for a route from the current position to a destination. The ECU 24, the map database 24a, and the GPS sensor 24b constitute a so-called navigation apparatus.

The ECU 25 includes a communication apparatus 25a for inter-vehicle communication. The communication apparatus 25a performs wireless communication with other vehicles in the vicinity thereof, and exchanges information between vehicles.

The ECU 26 controls a power plant 6. The power plant 6 is a mechanism for outputting a driving force for rotating driving wheels of the vehicle 1, and includes an engine and a transmission, for example. The ECU 26 controls the output of the engine according to a driving operation (an accelerator operation or an acceleration operation) that is performed by a driver and detected by an operation detection sensor 7a provided in an accelerator pedal 7A, and changes the gear ratio of the transmission based on information such as the vehicle speed detected by a vehicle speed sensor 7c, for example. If the driving state of the vehicle 1 is automated driving, the ECU 26 automatically controls the power plant 6 according to an instruction issued by the ECU 20, and controls the acceleration/deceleration of the vehicle 1.

The ECU 27 controls lighting devices (head lights, tail lights, and the like) including direction indicators 8 (turn signals). In the example shown in FIG. 1, the direction indicators 8 are provided in the front portion, door mirrors, and the rear portion of the vehicle 1.

The ECU 28 controls an input/output apparatus 9. The input/output apparatus 9 outputs information to the driver, and accepts information input by the driver. A sound output apparatus 91 notifies the driver of information using sound. A display apparatus 92 notifies the driver of information by displaying an image. The display apparatus 92 is disposed on the surface of a driver seat, for example, and constitutes an instrument panel or the like. Note that the driver is notified using sound or a display as an example herein, but may be notified using vibrations or light. Also, the driver may be notified of information by combining two or more of sound, a display, vibrations, and light. Also, the combination thereof may be changed or the manner of a notification may be changed according to a level (a degree of urgency, for example) of illumination that the driver is to be notified of. An input apparatus 93 is a switch group that is disposed at a position at which the driver can operate the input apparatus 93 and issues an instruction to the vehicle 1, and may also include a sound input apparatus. The ECU 28 can carry out guidance regarding a traveling control of the ECU 20. Detailed guidance will be described later. The input apparatus 93 may also include a switch used to control operations of the traveling control performed by the ECU 20. The input apparatus 93 may also include a camera for detecting the direction of vision of the driver.

The ECU 29 controls a brake apparatus 10 and a parking brake (not shown). The brake apparatus 10 is a disk brake apparatus, for example, and is provided in each wheel of the vehicle 1, and decelerates or stops the vehicle 1 by applying resistance to rotation of the wheels. The ECU 29 controls operations of the brake apparatus 10 according to a driving operation (brake operation) of the driver that was detected by an operation detection sensor 7b provided in a brake pedal 7B, for example. If the driving state of the vehicle 1 is automated driving, the ECU 29 automatically controls the brake apparatus 10 according to an instruction issued by the ECU 20, and controls decelerating and stopping of the vehicle 1. The brake apparatus 10 and the parking brake may also be activated in order to keep the vehicle 1 stopped. Also, if the transmission of the power plant 6 includes: a parking lock mechanism, the parking lock mechanism may also be activated in order to keep the vehicle 1 stopped.

Figure 2:
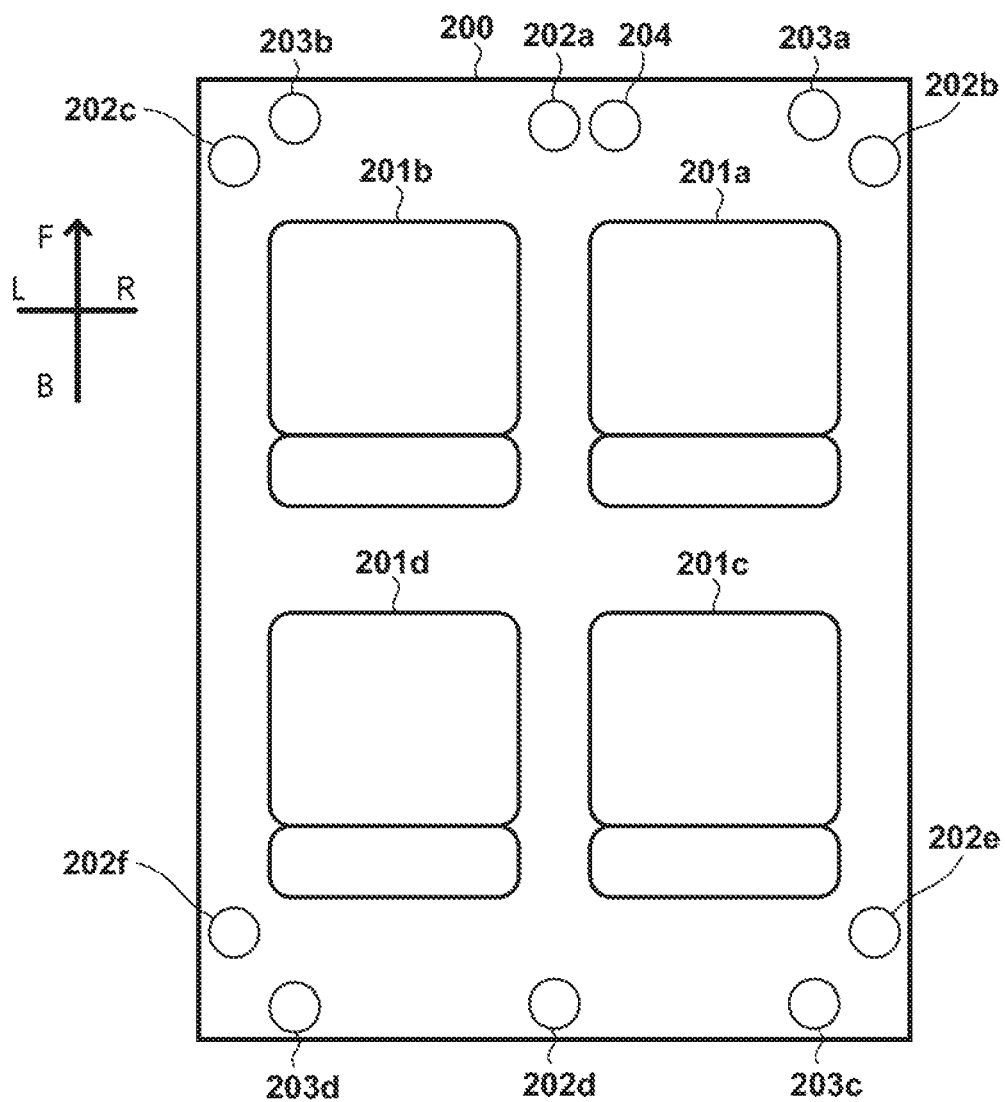
FIG. 2 is a schematic diagram illustrating a configuration example of a vehicle interior according to an embodiment.

Referring to FIG. 2, the configuration of a vehicle interior 200 of the vehicle 1 will be further described. FIG. 2 is a plan view of the vehicle interior 200. The vehicle interior 200 is a space of the vehicle 1. The upper side in FIG. 2 indicates the front of the vehicle 1, and the right side in FIG. 2 indicates the right side of the vehicle 1. Four seats 201a to 201d are attached to the vehicle interior 200. When it is not necessary to distinguish the four seats 201a to 201d from each other, these four seats 201a to 201d are collectively referred to as "seats 201". It is presumed that the vehicle 1 is a right-hand drive vehicle. Thus, the seat 201a is a driver seat.

Six sound output apparatuses 202a to 202f are mounted in the vehicle interior 200. When it is not necessary to distinguish the six sound output apparatuses 202a to 202f from each other, these sound output apparatuses 202a to 202f are collectively referred to as "sound output apparatuses 202". The sound output apparatus 202a is attached to the front center of the vehicle interior 200. The sound output apparatus 202b is attached to the front right side of the vehicle interior 200. The sound output apparatus 202c is attached to the front left side of the vehicle interior 200. The sound output apparatus 202d is attached to the rear center of the vehicle interior 200. The sound output apparatus 202e is attached to the rear right side of the vehicle interior 200. The sound output apparatus 202f is attached to the rear left side of the vehicle interior 200. The sound output apparatuses 202a to 202f correspond to the so and output apparatus 91 shown in FIG. 1. The sound output apparatuses 202 are each constituted by combining amplifier and a speaker, for example. The ECU 28 outputs audio data such as music and sound information to the inside of the vehicle interior 200 by controlling the sound output apparatuses 202a to 202f. Also, the ECU 28 can control the direction of sound to occupants (for example, a driver and a fellow passenger) by adjusting the volume of the sound output apparatuses 202a to 202f.

Four sound input apparatuses 203a to 203d are mounted in the vehicle interior 200. When it is not necessary to distinguish the four sound input apparatuses 203a to 203d from each other, these sound input apparatuses 203a to 203d are collectively referred to as "sound input apparatuses 203". The sound input apparatus 203a is attached to the front right side of the vehicle interior 200. The sound input apparatus 203b is attached to the front left side of the vehicle interior 200. The sound input apparatus 203c is attached to the rear right side of the vehicle interior 200. The sound input apparatus 203d is attached to the rear left side of the vehicle interior 200. The sound input apparatuses 203a to 203d correspond to the input apparatus 93 shown in FIG. 1. The sound input apparatuses 203 are each constituted by a microphone, for example. The ECU 28 collects sound generated in the vehicle interior 200 by controlling the sound input apparatuses 203a to 203d. Also, the ECU 28 can specify directions of sounds generated in the vehicle interior 200 by specifying volumes of the sounds that are respectively acquired by the sound input apparatuses 203a to 203d.

A camera 204 is mounted in the vehicle interior 200. The camera 204 is attached to the front center of the vehicle interior 200. The camera 204 corresponds to the input apparatus 93 shown in FIG. 1. The ECU 28 can acquire states of occupants (for example, mouth is open, eyes are closed, positions, the orientation of a face, and the like) by analyzing an image captured by the camera 204. The number of sound output apparatuses 202, the number of sound input apparatuses 203, and the number of cameras 204 that are included in the vehicle interior 200 are not limited to the above-described examples.

Figure 3:
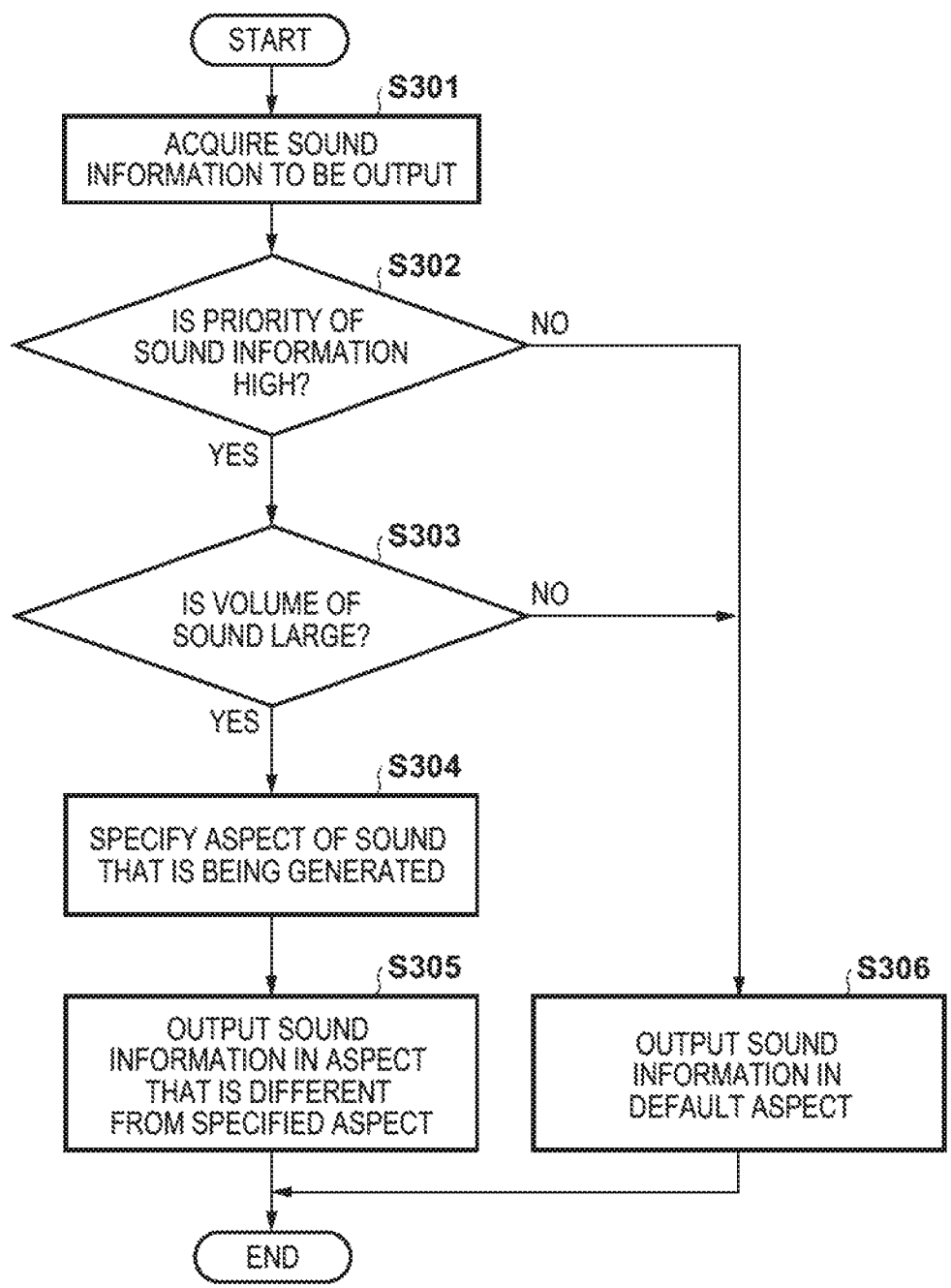
FIG. 3 is a flowchart illustrating an example of a control method according to an embodiment.

Next, referring to FIG. 3, an example of a method with which the ECU 28 controls the sound output apparatuses 202 and outputs sound information will be described. The method shown in FIG. 3 is processed by the processor of the ECU 28 executing a command of a program stored in the ECU 28, for example. Instead of this, dedicated hardware (for example, a circuit) may execute steps.

In step S301, the ECU 28 acquires sound information to be output from another ECU (for example, the ECU 21). Sound information includes information that is directed to a driver, such as route guidance or a notification regarding automated driving, and information that is directed to all of the occupants, such as information about surrounding tourist spots. The ECU 28 acquires sound information and its priority. In one example, sound information has two types of priorities, that is, high priority and low priority. For example, information such as route guidance and a driving takeover request has high priority, and information such as tourist guidance has low priority. The priority of information is set in advance, and stored in the ECU 28.

In step S302, the ECU 28 determines whether or not the priority of sound information to be output is greater than or equal to a threshold. If the condition is satisfied (YES in step S302), the ECU 28 advances processing to step S303, and if the condition is not satisfied (NO in step S302), the ECU 28 advances processing to step S306. If sound information has two priorities, high priority is greater than or equal to a threshold, and low priority is less than the threshold.

In step S303, the ECU 28 determines whether or not the volume of sound generated in the vehicle interior 200 is greater than or equal to a threshold. If the condition is satisfied (YES in step S303), the ECU 28 advances processing to step S304, and if the condition is not satisfied (NO in step S303), the ECU 28 advances processing to step S306.

If no sound is generated in the vehicle interior 200, the volume is zero, that is, the volume is less than the threshold. The sound that is being generated in the vehicle interior 200 includes sound that is being generated by a person who is present in the vehicle interior 200 and sound that is being generated by a sound output apparatus that is present in the vehicle interior 200. A person who is present in the vehicle interior 200 is an occupant (a driver or fellow passenger), for example, and the sound that the person generates is a speaking voice or a singing voice. The sound that is being generated by the sound output apparatus is sound that is being output from the sound output apparatus 202 (for example, sound output from a radio, and television, DVD), and sound output from a sound output apparatus (a smartphone, music player, robot, or the like) that has been brought into the vehicle interior 200. The ECU 28 is capable of acquiring the volume of sound using the sound input apparatus 203. If sound that is being generated in the vehicle interior 200 is sound that is being output from the sound output apparatus 202, the ECU 28 is capable of acquiring the volume without using the sound input apparatus 203.

In step S304, the ECU 28 specifies the aspect of sound that is being generated in the vehicle interior 200. The aspect of sound includes a basic frequency of sound and a direction in which sound is transmitted. First, the ECU 28 acquires sound that is being generated in the vehicle interior 200 using the sound input apparatus 203. Next, the ECU 28 analyzes this sound and thus acquires at least one of the basic frequency of the sound and/or the direction in which the sound is transmitted.

In step S305, the ECU 28 controls the sound output apparatuses 202 such that sound information is output in an aspect that is diffrent from the specified aspect while sound is being generated in the vehicle interior 200. For example, the ECU 28 outputs sound information at a frequency that is different from the basic frequency of the specified sound. For example, the ECU 28 specifies that the sound that is being generated is a voice of a person of a particular sex, and controls the sound output apparatuses 202 such that sound information is output using a voice of a person of the sex that is different from the particular sex of this person. Specifically, if the person who is generating sound is a female, the ECU 28 outputs sound information sing a male voice.

The ECU 28 may output sound information such that a direction in which this sound is transmitted is different from the direction in which the specified sound is transmitted, instead of or in addition to using a different frequency from the basic frequency. For example, the ECU 28 specifies a position of a listener (for example, the driver) who is to listen to sound information to be output in the vehicle interior 200, and controls the sound output apparatus 202 to output sound in such that the sound is transmitted to the position of this listener from at least one of up-down, left-right, and/or front-rear sides that is opposite to the side on which the sound is being generated. The listener who is to listen to sound information changes depending on the content of sound information. Sound information includes information directed to the driver, information directed to a fellow passenger, and information directed to all of the occupants. The ECU 28 may specify the position of the listener who is to listen to the sound information based on an image captured by the camera 204.

In step S306, the ECU 28 outputs sound information in a default aspect. If sound is being generated in the vehicle interior 200, the ECU 28 may output the sound information after waiting for the sound that is being generated to end.

Figure 4A:
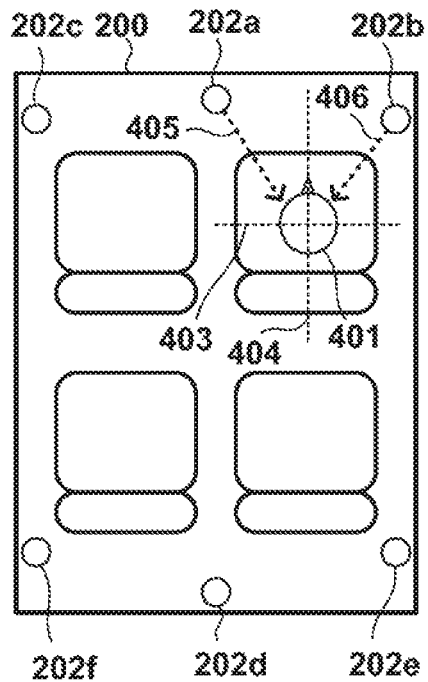
FIGS. 4A to 4F are schematic diagrams illustrating directions in which sound information is transmitted according to an embodiment.

Referring to FIGS. 4A to 4F, a direction in which sound is transmitted will be described. In FIG. 4A, it is presumed that a driver 401 is seated on the seat 201*a*. It is presumed that radio sound is being generated from the sound output apparatus 202*a* and is transmitted to the driver 401 along an arrow 405. In this case, the ECU 28 selects a sound output apparatus 202 such that sound information is transmitted from the opposite side of the arrow 405 with respect to a median coronal plane 403 or a median sagittal plane 404 of the head of the driver 401. The ECU 28 may transmit sound information from the opposite side of the arrow 405 with respect to the median coronal plane 403 of the head of the driver 401 by outputting sound information from either of the sound output apparatuses 202*d* and 202*e*. That is, the ECU 28 may transmit sound information from the opposite side in the front-and-rear direction. The ECU 28 may transmit sound information from the opposite side of the arrow 405 with respect to the median sagittal plane 404 of the head of the driver 401 by outputting sound information from the sound output apparatus 202*b*. That is, the ECU 28 may transmit sound information from the opposite side in the left-and-right direction.

If there are a plurality of sound output apparatuses 202 configured to output sound information from the opposite side, the ECU 28 may output sound information from a sound output apparatus located in the front of the vehicle interior 200. This is because, as a result of outputting sound information from the front, the listener can understand that this sound information is output from a vehicle system. For example, the ECU 28 outputs sound information from the sound output apparatus 202*b*. This sound information is transmitted to the driver 401 along an arrow 406. The arrow 405 and the arrow 406 are located opposite each other with respect to the median sagittal plane 404.

Figure 4B:
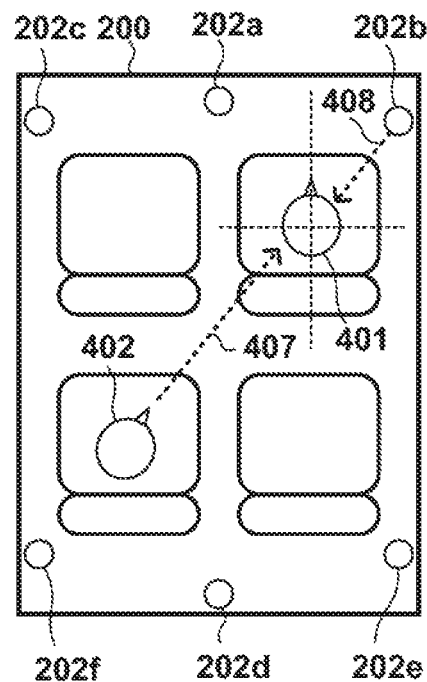

In the example shown in FIG. 4B, sound from a fellow passenger 402 who is seated on the seat 201*d* is transmitted to the driver in the transmission direction indicated by an arrow 407. In this case, the ECU 28 outputs sound information from the sound output apparatus 202*b* such that this sound information is transmitted along an arrow 408. The arrow 407 and the arrow 408 are located opposite each other with respect to the median sagittal plane 404, and are also located opposite each other with respect to the median coronal plane 403.

Figure 4C:
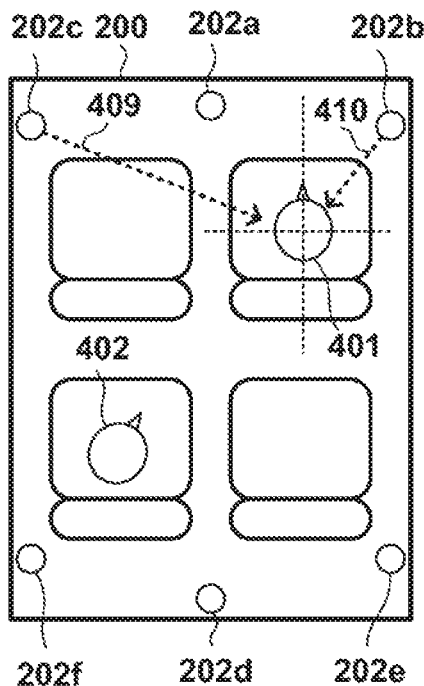

In the example shown in FIG. 4C, the sound output from the sound output apparatus 202*c* is transmitted to the driver in the transmission direction indicated by an arrow 409. In this case, the ECU 28 outputs sound information from the sound output apparatus 202*b* such that this sound information is transmitted along an arrow 410. The arrow 409 and the arrow 410 are located opposite each other with respect to the median sagittal plane 404.

Figure 4D:
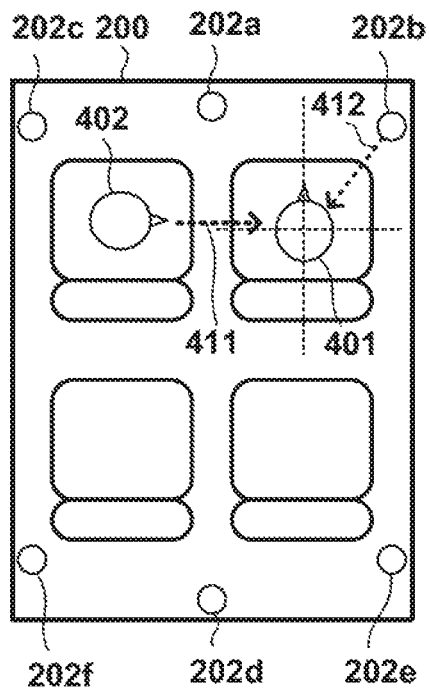

In the example shown in FIG. 4D, sound from the fellow passenger 402 who is seated on the seat 201*b* is transmitted to the driver in the transmission direction indicated by an arrow 411. In this case, the ECU 28 outputs sound information from the sound output apparatus 202*b* such that this sound information is transmitted along an arrow 412. The arrow 411 and the arrow 412 are located opposite each other with respect to the median sagittal plane 404.

Figure 4E:
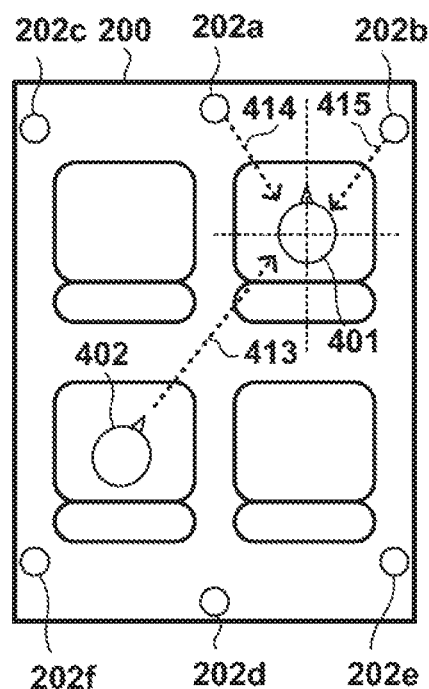

In the example shown in FIG. 4E, sound from the fellow passenger 402 who is seated on the seat 201*d* is transmitted to the driver in the transmission direction indicated by an arrow 413, and the sound output from the sound output apparatus 202*a* is transmitted to the driver in the transmission direction indicated by an arrow 414. In this case, the ECU 28 outputs sound information from the sound output apparatus 202*b* such that this sound information is transmitted along an arrow 415. The arrow 413 and the arrow 415 are located opposite each other with respect to the median sagittal plane 404. Also, the arrow 414 and the arrow 415 are located opposite each other with respect to the median sagittal plane 404.

Figure 4F:
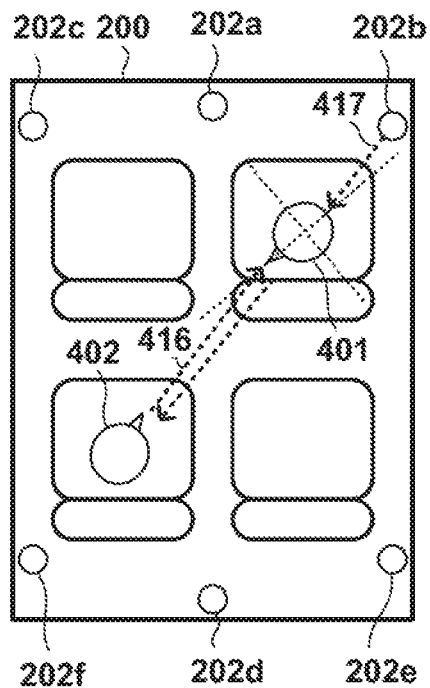

In the example shown in FIG. 4F, sound from the fellow passenger 402 that is seated on the seat 201*d* is transmitted to the driver in the transmission direction indicated by an arrow 416. The driver 401 faces the fellow passenger 402. The orientation of the driver 401 can be specified by analyzing an image captured by the camera 204. In this case, the ECU 28 outputs sound information from the sound output apparatus 202*b* such that this sound information is transmitted along an arrow 417. The arrow 416 and the arrow 417 are located opposite each other with respect to the median coronal plane 403.

In the above-described example, the case where one listener (a driver) is to listen to the sound information to be output was described. If a plurality of listeners are to listen to the sound information to be output, the ECU 28 may specify directions in which the sound information is transmitted, for the corresponding listeners. Then, the ECU 28 controls the directivity of the sound output apparatus 202 such that sound information is transmitted to each listener in the specified transmission direction.

In the above-described embodiment, a case where sound information is output in the vehicle interior 200 of the vehicle 1 was described. Instead of this, sound information may be output in another space. For example, sound information may be provided to participants in a conference in a room such as a conference room. In this case, the sound output apparatuses 202, the sound input apparatuses 203, and the camera 204 are it stalled in the room.

Summary of Embodiment

Configuration 1

A control apparatus (28) for controlling a sound output apparatus (202), the control apparatus (28) including:

a specifying unit (S304) configured to specify an aspect of sound that is being generated in a space (200); and a control unit (S305) configured to control the sound output apparatus so as to output sound information in an aspect that is different from the specified aspect while sound is being generated in the space.

This configuration makes it possible to provide sound information that can be easily understood while other sound is being generated.

Configuration 2

The control apparatus according to Configuration 1, in which the aspect of the sound includes a basic frequency of the sound.

This configuration makes it possible to provide sound information in a tone that is different from that of the sound that is being generated.

Configuration 3

The control apparatus according to Configuration 1 or 2, in which the specifying unit specifies that the sound that is being generated is a voice of a person of a particular sex, and the control unit controls the sound output apparatus so as to output sound information using a voice of a person of the sex that is different from the particular sex of the person who is generating the sound.

This configuration makes it possible to provide sound information using the sound of a person of the sex that is different from the sex of the person who is generating the sound.

Configuration 4

The control apparatus according to any one of Configurations 1 to 3, in which the aspect of the sound includes a direction in which the sound is transmitted.

This configuration makes it possible to provide sound information in a direction that is different from that of the sound that is being generated.

Configuration 5

The control apparatus according to any one of Configurations 1 to 4, further including:

a position specifying unit (204) configured to specify a position of a listener in the space who is to listen to sound information to be output, in which the control unit controls the sound output apparatus so as to output sound information that is transmitted to the position of the listener from at least one of up-down, left-right, and/or front-rear sides that is opposite to the side on which the sound is being generated.

This configuration makes it possible to provide sound information in a direction that is different from that of the sound that is being generated.

Configuration 6

The control apparatus according to any one of Configurations 1 to 5, in which the sound that is being generated includes a voice that is being generated by a person (402) who is present in the space.

This configuration makes it possible to provide sound information that can be distinguished from the sound that is being generated by a person.

Configuration 7

The control apparatus according to any one of Configurations 1 to 6, in which the sound that is being generated includes sound that is being generated by a sound output apparatus that is present in the space.

This configuration makes it possible to pros sound information that can be distinguished from the sound that is being generated by the sound output apparatus.

Configuration 8

The control apparatus according to any one of Configurations 1 to 7, the control unit determines whether or not the priority of sound information to be output is greater than or equal to a threshold (step S302), and if the priority is greater than or equal to the threshold, controls the sound output apparatus so as to output sound information in an aspect that is different from the specified aspect.

This configuration makes it possible to provide sound information such that sound information with high priority can be easily understood.

Configuration 9

The control apparatus according to any one of Configurations 1 to 8, the control unit determines whether or not the volume of the sound that is being generated is greater than or equal to a threshold (step S303), and if the volume is greater than or equal to the threshold, controls the sound output apparatus so as to output sound information in an aspect that is different from the specified aspect.

This configuration makes it possible to provide sound information that can be easily understood even if the volume of the sound that is being generated is large.

Configuration 10

The control apparatus according to any one of Configurations 1 to 9, in which the space is a vehicle interior (200) of a vehicle (1).

This configuration makes it possible to provide sound information that can be easily understood while other sound is being generated in the vehicle interior.

Configuration 11

A vehicle (1) including the control apparatus according to any one of Configurations 1 to 10.

This configuration makes it possible to provide sound information that can be easily understood while other sound is being generated.

Configuration 12

A method for controlling a sound output apparatus (202), the method including:

specifying (S304) an aspect of sound that is being generated in a space; and controlling (S305) the sound output apparatus so as to output sound information in an aspect that is different from the specified aspect while sound is being generated in the space.

This configuration makes it possible to provide sound information that can be easily understood while other sound is being generated.

Configuration 13

A program for causing a computer to function as units of the control apparatus according to any one of Configurations 1 to 10.

This configuration makes it possible to provide sound information that can be easily understood while other sound is being generated.

What is claimed is:

1. A control apparatus for controlling a sound output apparatus, the control apparatus comprising:
    a specifying unit configured to specify an aspect of sound that is being generated in a space;
    a control unit configured to control the sound output apparatus so as to output sound information, toward the space in which the sound is being generated, in an aspect that is different from the specified aspect; and
    a position specifying unit configured to specify a position of a listener in the space who is to listen to sound information to be output,
    wherein the control unit controls the sound output apparatus so as to output sound information that is transmitted to the position of the listener from at least one of up-down, left-right, and/or front-rear sides that is opposite to the side on which the sound is being generated.

2. The control apparatus according to claim 1,
    wherein the aspect of the sound includes a basic frequency of the sound.

3. The control apparatus according to claim 1,
    wherein the specifying unit specifies that the sound that is being generated is a voice of a person of a particular sex, and
    the control unit controls the sound output apparatus so as to output sound information using a voice of a person of the sex that is different from the particular sex of the person who is generating the sound.

4. The control apparatus according to claim 1,
    wherein the aspect of the sound includes a direction in which the sound is transmitted.

5. The control apparatus according to claim 1, wherein the sound that is being generated includes a voice that is being generated by a person who is present in the space.

6. The control apparatus according to claim 1, wherein the sound that is being generated includes sound that is being generated by a sound output apparatus that is present in the space.

7. The control apparatus according to claim 1, wherein the space is a vehicle interior of a vehicle.

8. A vehicle comprising the control apparatus according to claim 1.

9. A non-transitory storage medium in which a program for causing a computer to function as units of the control apparatus according to claim 1 is stored.

10. A control apparatus for controlling a sound output apparatus, the control apparatus comprising:
a specifying unit configured to specify an aspect of sound that is being generated in a space; and
a control unit configured to control the sound output apparatus so as to output sound information, toward the space in which the sound is being generated, in an aspect that is different from the specified aspect,
wherein the control unit
determines whether or not a priority of sound information to be output is greater than or equal to a threshold, and
if the priority is greater than or equal to the threshold, controls the sound output apparatus so as to output sound information in an aspect that is different from the specified aspect.

11. A non-transitory storage medium in which a program for causing a computer to function as units of the control apparatus according to claim 10 is stored.

12. A control apparatus for controlling a sound output apparatus, the control apparatus comprising:
a specifying unit configured to specify an aspect of sound that is being generated in a space; and
a control unit configured to control the sound output apparatus so as to output sound information, toward the space in which the sound is being generated, in an aspect that is different from the specified aspect,
wherein the control unit
determines whether or not the volume of the sound that is being generated is greater than or equal to a threshold, and
if the volume is greater than or equal to the threshold, controls the sound output apparatus so as to output sound information in an aspect that is different from the specified aspect.

13. A non-transitory storage medium in which a program for causing a computer to function as units of the control apparatus according to claim 12 is stored.

* * * * *